Patented June 29, 1926.

UNITED STATES PATENT OFFICE.

TSUGUYOSHI MII, OF YAMAGUCHI-KEN, JAPAN, ASSIGNOR TO KOTARO ISOMURA, OF YAMAGUCHI-KEN, JAPAN.

PROCESS OF MANUFACTURING OIL OF A LOW BOILING POINT FROM MINERAL HEAVY OILS.

No Drawing. Application filed January 19, 1923. Serial No. 613,765.

This invention relates to an improvement in the process of manufacturing low-boiling-point oil, such as naphtha, from petroleum heavy oil or other mineral heavy oil, by cracking, and the object thereof is to obtain a large quantity of low-boiling-point oil economically by causing the material to decompose at a comparatively low temperature.

A process of manufacturing low-boiling-point oil from petroleum heavy oil by adding thereto a catalytic agent, such as aluminum chloride, and subjecting the same to destructive distillation, is commonly known. But such process is very expensive and cannot be industrially carried on. The present invention is an improvement in such process and removes the said drawback. It consists in cracking mineral heavy oil in the presence of a mixture of a clay, such as acid clay, fuller's earth, Florida earth, or the like, the principal ingredient of which is aluminum hydrosilicate, with a soluble chloride, other than aluminum chloride, such as calcium chloride, sodium chloride, or the like.

According to the present invention, powder, in dry state, of calcium chloride or any other soluble chlorides, other than aluminum chloride, is mixed with, and caused to suspend in, heavy oil which is dehydrated beforehand. A mixture of similar soluble chloride with aluminum hydrosilicate is also prepared and the former caused to impregnate the latter. Then the above two preparations are mixed and the work of cracking begun. During the distillation, the water-soluble chloride such as alkali-metal chlorides, and alkali-earth-metal chloride which have been absorbed by the hydrosilicate, being decomposed by heat, will liberate hydrochloric acid upon the surface of the said hydrosilicate. The freed hydrochloric acid in its turn acts on the aluminum hydrosilicate and forms aluminum chloride, which being very active in its nascent state and being distributed on the large contact surface of the hydrosilicate, easily converts high grade hydrocarbon of the heavy oil to a light oil. Thus, as the aluminum chloride disappears from the contact surface of the hydrosilicate while the reaction is progressing, the soluble chloride which is in suspension in the oil will be gradually absorbed upon the surface of the said hydrosilicate, forming fresh aluminum chloride, accelerating the cracking of the oil by replenishing the aluminum chloride and thus continuing the reaction.

The following is an example of carrying my invention into practice:—

To 100 parts of petroleum heavy oil, which is dehydrated by heating are added, 4 to 10 parts of powdered calcium chloride, well dried, and the mixture well stirred, so as to cause the latter to be uniformly suspended in the former. 100 parts of an acid clay are caused to absorb 2 parts of calcium chloride or sodium chloride dissolved in water. The preparation is dried at a low temperature as far as possible, thus causing the chloride to impregnate into the acid clay. This preparation is then mixed with the heavy oil containing calcium chloride suspended in it, and the mixture put into a distilling still and the oil cracked at a temperature of about 220° C.

If thus treated, common petroleum heavy oil will yield about 40% of naphtha of Baumé 54-50° and about 20% illuminating oil.

In this invention, if a clay the chief ingredient of which is aluminum hydrosilicate is used, such as acid clay, fuller's earth, Florida earth, or the like, which naturally contains suitable soluble chloride, the addition of chloride to the heavy oil as above suggested may be dispensed with either entirely or in part.

Claims.

1. The process of producing a catalyst for the manufacture of oils having a low boiling point, which consists in impregnating an aluminum hydrosilicate with a soluble chloride.

2. The process of producing a catalyst for the manufacture of oils having a low boiling point, which consists in impregnating an aluminum hydrosilicate with calcium chloride.

3. The process of producing a catalyst for the manufacture of oils having a low boiling point, which consists in impregnating acid clay with a soluble chloride.

4. The process of producing a catalyst for the manufacture of oils having a low boiling point, which consists in impregnating acid clay with calcium chloride.

5. The process of producing a catalyst for the manufacture of oils having a low boiling point, which consists in forming a mixture of an aluminum hydrosilicate and a soluble chloride, and drying said mixture at a low temperature thereby to cause the chloride to impregnate said hydrosilicate.

6. The process of producing a catalyst for the manufacture of oils having a low boiling point, which consists in forming a mixture of an aluminum hydrosilicate and calcium chloride, and drying said mixture at a low temperature thereby to cause the chloride to impregnate said hydrosilicate.

7. The process of producing a catalyst for the manufacture of oils having a low boiling point, which consists in forming a mixture of acid clay and a soluble chloride, and drying said mixture at a low temperature thereby to cause the chloride to impregnate said acid clay.

8. The process of producing a catalyst for the manufacture of oils having a low boiling point, which consists in forming a mixture of acid clay and calcium chloride, and drying said mixture at a low temperature thereby to cause the chloride to impregnate said acid clay.

9. The process of producing a catalyst for the manufacture of oils having a low boiling point, which consists in forming a mixture of acid clay and calcium chloride in the approximate proportions of 100 parts to 2 parts respectively, and drying said mixture at a low temperature thereby to cause the chloride to impregnate said acid clay.

In testimony whereof I have signed my name to this specification.

TSUGUYOSHI, MII.